No. 866,989. PATENTED SEPT. 24, 1907.
C. E. TWAMLY.
SEED CORN TESTER.
APPLICATION FILED APR. 9, 1907.
2 SHEETS—SHEET 2.
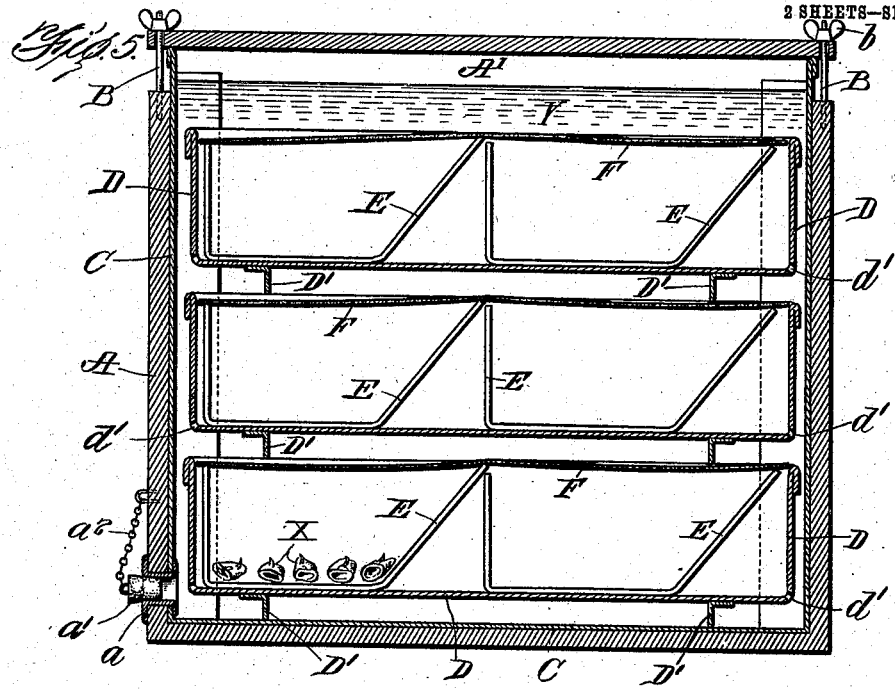
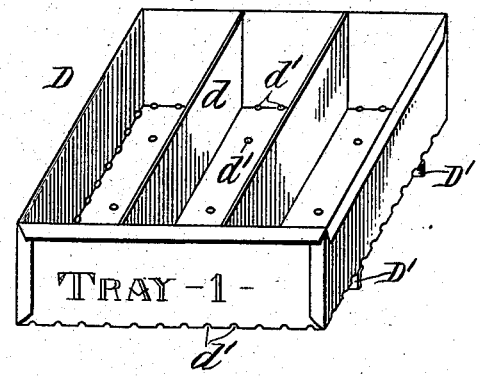
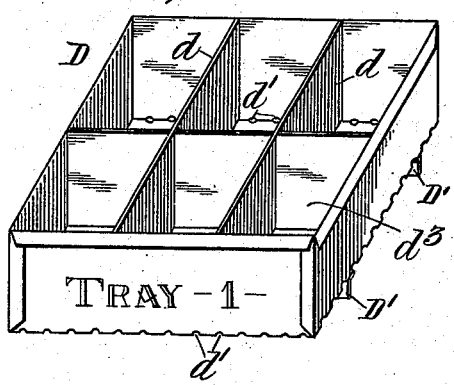
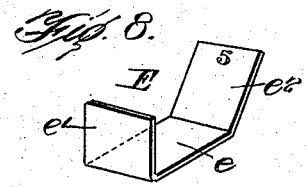
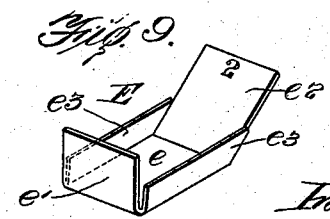
Witnesses:
Paul J. Gathmann
M. Lilian Adams
Inventor
C. E. Twamly.
By his Attorneys:
Baldwin Wight

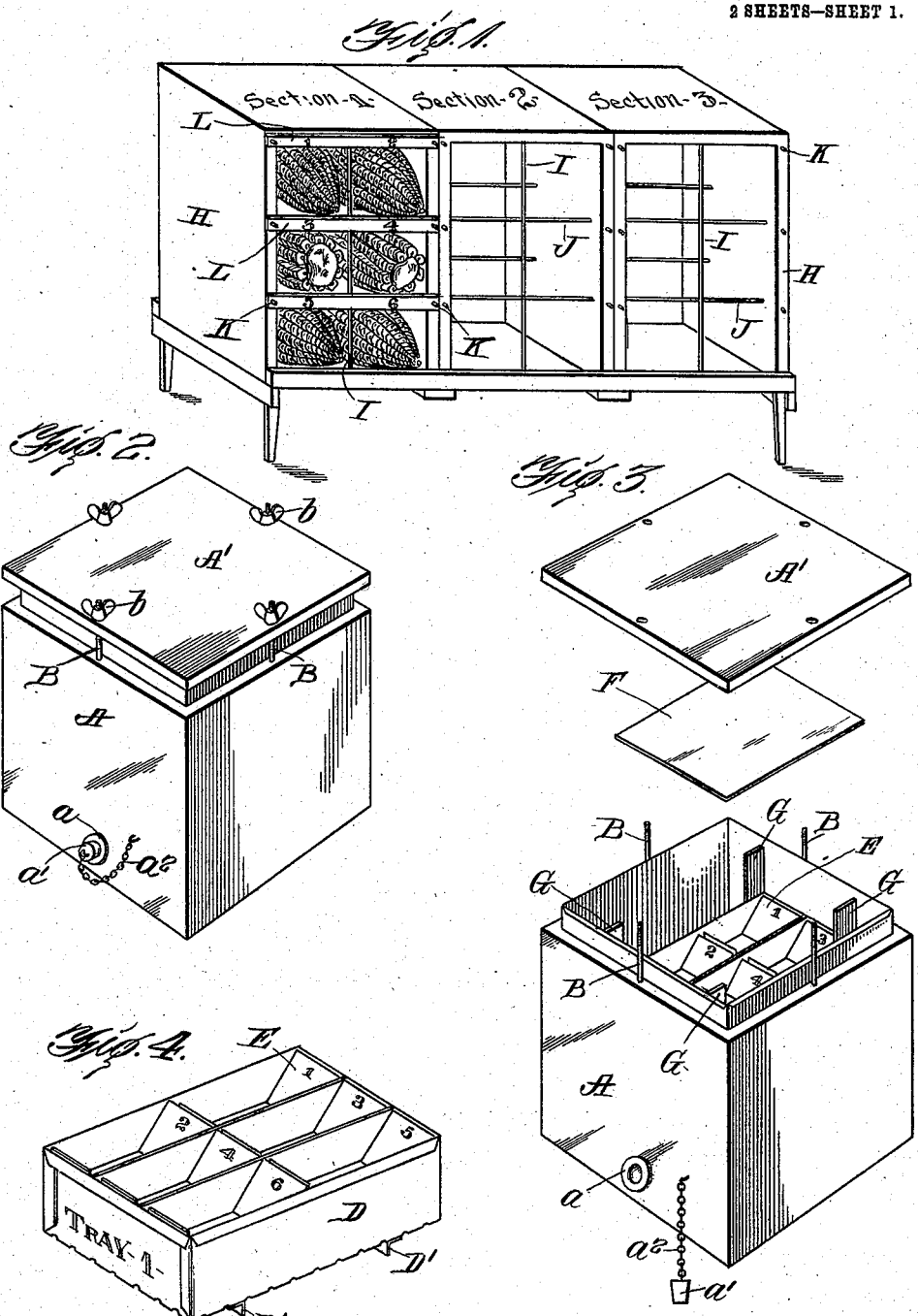

UNITED STATES PATENT OFFICE.

CLARK E. TWAMLY, OF ALEXANDRIA, SOUTH DAKOTA.

SEED-CORN TESTER.

No. 866,989.      Specification of Letters Patent.      Patented Sept. 24, 1907.

Application filed April 9, 1907. Serial No. 367,250.

*To all whom it may concern:*

Be it known that I, CLARK E. TWAMLY, a citizen of the United States of America, residing in Alexandria, in the county of Hanson and State of South Dakota, have invented certain new and useful Improvements in Seed-Corn Testers, of which the following is a specification.

The object of my invention is to provide simple and efficient means for testing seed corn to determine which ears of corn contain good seed, or a large percentage of good seed, and which contain such a small percentage as to render them unprofitable for use as seed. Letters Patent No. 830,383, granted to me September 4, 1906, are for apparatus of this kind.

The apparatus constructed in accordance with my present invention is somewhat simpler than that shown in my patent and can be constructed at less expense and operated more easily.

According to my present invention, I provide a box or casing which is water-tight and air-tight and contains trays carrying cups or receptacles for seed. The box is provided with a discharge opening at the bottom and has a detachable top or cover. The trays are divided into compartments and are perforated to allow the passage of water to the interior thereof, while the cups or receptacles for the seed are consecutively numbered in order that the seed which they contain may be identified with the ears of corn from which they were taken.

In connection with the germinating apparatus I provide a crib for holding ears of corn in which the ears may be kept ventilated and dry, properly measured and marked for identification.

In the accompanying drawings, Figure 1 is a perspective view of a crib made up of three sections. Fig. 2 is a perspective view of the germinating box with the top or cover secured in place and the discharge opening at the bottom of the box closed. Fig. 3 is a perspective view with the cover removed and with the water discharge opening open. Fig. 4 is a perspective view of one of the trays containing seed cups. Fig. 5 shows a vertical central section through the germinator. Fig. 6 is a perspective view of one of the trays. Fig. 7 is a perspective view of a modified form of tray. Fig. 8 is a perspective view of one form of cup or seed receptacle which may be employed, and Fig. 9 is a perspective view of another form.

The germinating box, A, may be constructed of wood lined with metal, C, and is closed at the bottom and at the sides but has a discharge opening, $a$, which may be closed by a plug or stopper, $a'$, attached to a chain, $a^2$. Preferably the lining, C, extends above the top of the box, but this is not essential. The cover, A′, is attached to the box by means of vertical rods, B, extending through holes in the cover and threaded to engage nuts, $b$, by means of which the cover may be screwed down tightly upon its seat.

As shown in Fig. 3, vertically arranged strips, G, are employed to hold the trays away from opposite sides of the box. The tray, D, shown in Fig. 6 has a bottom which is perforated at $d'$ and it is divided into compartments by vertical partitions, $d$. As illustrated, the tray is divided into three compartments and each tray is provided with cross pieces, D′, on the bottom for the purpose of holding the bottom tray elevated above the bottom of the box and for holding the bottoms of the other trays above the tops of the trays immediately below them. In Fig. 7 the three compartments of the tray are shown as further divided by a partition $d^3$ so as to provide six compartments.

I preferably employ a seed cup or receptacle, E, of the kind shown in Fig. 8, as this can be made very cheaply. As shown, it is made of a piece of sheet metal the bottom, $e$, of which joins a vertical end piece, $e'$, and an upwardly inclined end piece, $e^2$, which bears a number as indicated.

In Fig. 9, vertical side pieces, $e^3$, are added in order to prevent the seed from spilling out at the side, although this is not considered essential.

The seed cups or receptacles are arranged in the trays in the manner shown in Fig. 4 where it will be observed that the numbers are systematically arranged for purposes of identification, as will be hereinafter explained.

The trays are arranged in the germinating box in the manner indicated in Fig. 5. In this figure, X, indicates seed corn. After the seed receptacles are supplied with seed corn, they are covered by pieces of cloth, blotting paper or the like, F, and the trays are arranged one above the other as indicated in Fig. 5. Then, before applying the cover, water is poured into the box until its level is above the top of the uppermost tray. In Fig. 5, Y, indicates water. At this time, of course, the opening, $a$, is closed. The cover may then be applied and the germinator is allowed to stand until the corn is thoroughly soaked, this requires usually from 24 to 48 hours, after this the plug is removed and the water is allowed to flow out, then the cover is applied and made as tight as possible and the plug is again inserted. The germinator is then placed in a warm place and left until a sufficient time has elapsed for some of the seed to germinate. In five days the best seed will germinate and then the box may be opened and the seed which has sprouted first, or to the greatest extent, are considered the best seed and a record is made, then the trays may be replaced and the box closed and filled with water again, if necessary, and this is allowed to stand a few minutes, then the water is drained out and the box closed tightly and allowed to stand until the next day when the seed may be again examined. By the 8th day all the seed which is good will have sprouted.

Inasmuch as the seed receptacles are all numbered and the trays are numbered, the proper record can be kept.

In connection with the germinator I employ a crib of the kind illustrated in Fig. 1. This crib is made in sections corresponding with the number of trays employed. Section No. 1 of the crib corresponds with tray No. 1 of the germinator; section No. 2 of the crib, with tray No. 2; and section No. 3 of the crib, with tray No. 3. Each crib section has the same number of compartments as its corresponding tray. As illustrated, each crib section consists of a casing H, open at opposite ends and divided into compartments by wires, I, J, arranged at right angles to each other and on which the ears of corn may be supported. This construction affords perfect ventilation and easy manipulation.

In Fig. 1, each section is shown as containing six compartments corresponding with the six compartments of the trays. Instead of numbering each compartment, I provide detachable strips, L, carrying numbers and which may be detachably connected with the front ends of the cribs by means of pins, K. It is only necessary to provide numbered strips for one section as the same strips may be detached from one section and applied to the next. In this way a single set of strips may be used for three, a dozen, or even a hundred crib sections, and there will be no confusion inasmuch as each tray of the germinator is examined in connection with a single section of the crib.

Both the crib and the germinator may be constructed of inexpensive material and can be easily built, but they are efficient in operation and will never fail to indicate which ears of corn contain good seed and which are worthless.

It is obvious that my improvements may be employed for testing not only seed corn, but also other kinds of seed.

I claim:—

1. A seed germinator comprising a box having a detachable cover and provided with a water discharge opening at the bottom, a series of trays in the box, and a series of detachable numbered seed cups arranged in the trays.

2. A seed germinator comprising a water-tight box having a water discharge opening at the bottom, a detachable cover, a series of numbered perforated trays arranged in the box, and a series of numbered detachable seed cups or receptacles contained in the trays.

3. A seed germinator comprising a water-tight box having a detachable cover and provided with a water discharge opening at the bottom, a series of perforated numbered trays arranged one above the other in the box and having strips on the bottom to hold them apart, a series of numbered detachable seed cups or receptacles arranged in the trays and sheets of suitable material for covering the trays.

4. A seed germinator comprising a box having a detachable cover, provided with a water discharge opening at the bottom and containing a series of numbered trays having perforated bottoms and a series of receptacles for seed.

In testimony whereof, I have hereunto subscribed my name.

CLARK E. TWAMLY.

Witnesses:
  H. BLUNT,
  J. S. DESMOND.